United States Patent [19]
Inoue

[11] Patent Number: 5,418,769
[45] Date of Patent: May 23, 1995

[54] BEAM SPLITTER

[75] Inventor: Masato Inoue, Kawasaki, Japan

[73] Assignee: Canon Kabushiki Kaisha, Tokyo, Japan

[21] Appl. No.: 272,301

[22] Filed: Jul. 8, 1994

Related U.S. Application Data

[63] Continuation of Ser. No. 9,067, Jan. 26, 1993, abandoned.

[30] Foreign Application Priority Data

Jan. 30, 1992 [JP] Japan ................................. 4-038465

[51] Int. Cl.⁶ .............................................. G11B 7/00
[52] U.S. Cl. .................................... 369/112; 369/110; 369/100; 250/201.5; 359/629; 359/496
[58] Field of Search ............ 369/100, 110, 112, 44.23; 359/629, 831, 496; 250/201.5

[56] References Cited

U.S. PATENT DOCUMENTS

| | | | |
|---|---|---|---|
| 3,788,733 | 1/1974 | Breglia et al. | 350/287 |
| 4,571,028 | 2/1986 | Ziegler et al. | 350/287 |
| 4,799,210 | 1/1989 | Wilson et al. | 369/110 |
| 4,907,858 | 3/1990 | Hara et al. | 350/286 |
| 5,070,493 | 12/1991 | Marshall et al. | 369/112 |

FOREIGN PATENT DOCUMENTS 0067405 10/1983 European Pat. Off. .
0468685 1/1992 European Pat. Off. .

OTHER PUBLICATIONS

Patent Abstracts of Japan, Kokai No. 63-120574, vol. 12, No. 369, Oct. 1988.
Patent Abstracts of Japan, Kokai No. 01-134322, vol. 13, No. 382, Aug. 1989.
Durie, "Keeping Light Beams on Target," Machine Design, vol. 39, No. 23, Sep. 1967, pp. 128 through 131.
Patent Abstracts of Japan, Kokai No. 02-093501, vol. 14, No. 298, Jun. 1990.

*Primary Examiner*—Viet Q. Nguyen
*Attorney, Agent, or Firm*—Fitzpatrick, Cella, Harper & Scinto

[57] ABSTRACT

A beam splitter includes a first prism member, a second prism member and a third prism member, each of which have a vertex end. The first prism is cemented to the second prism and the second prism is cemented to the third prism. The vertex end of at least one of the three prism members is truncated. Also disclosed is an optical head that includes the beam splitter for splitting a light beam from a recording medium. A detector detects the light beam split by the beam splitter.

3 Claims, 7 Drawing Sheets

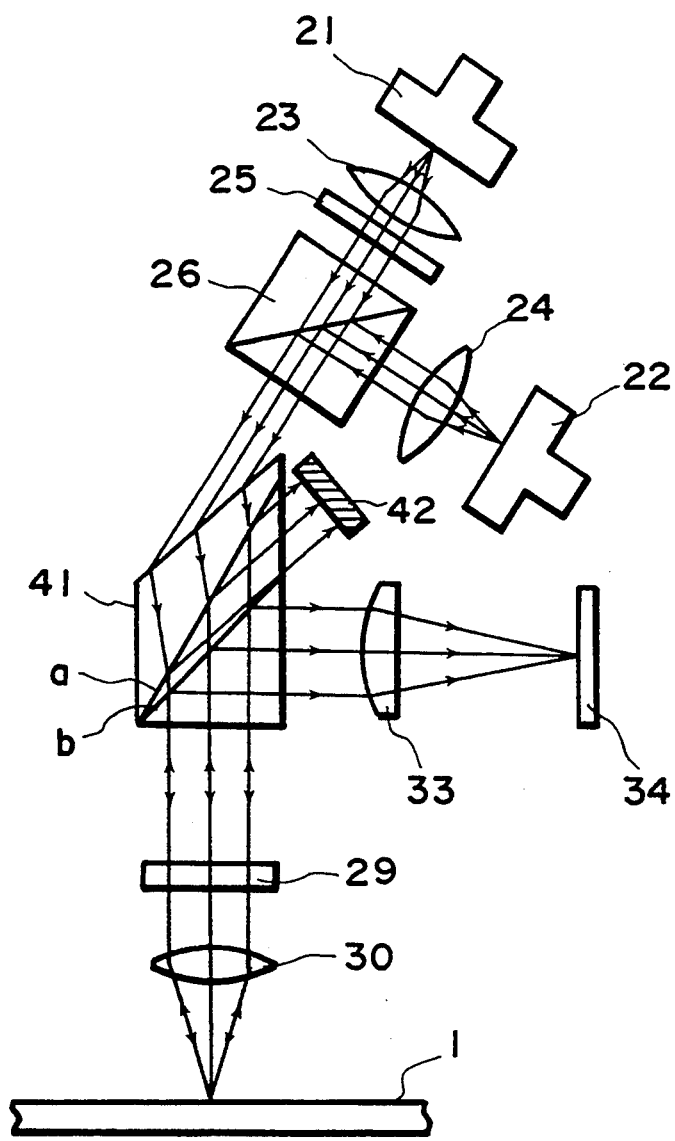
F I G. 10

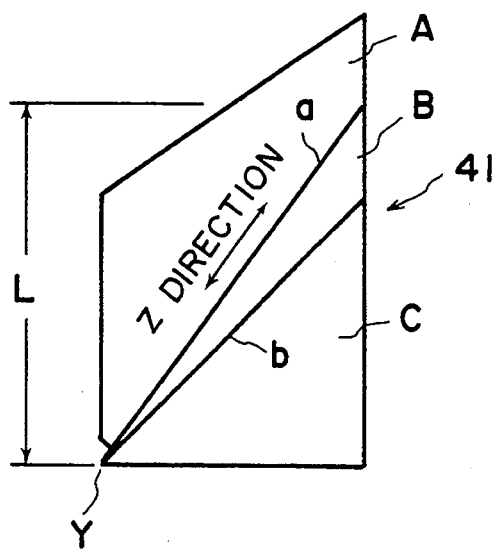
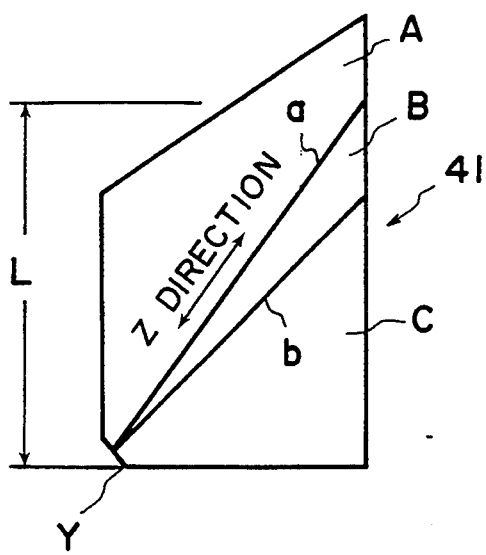
FIG. 11          FIG. 12
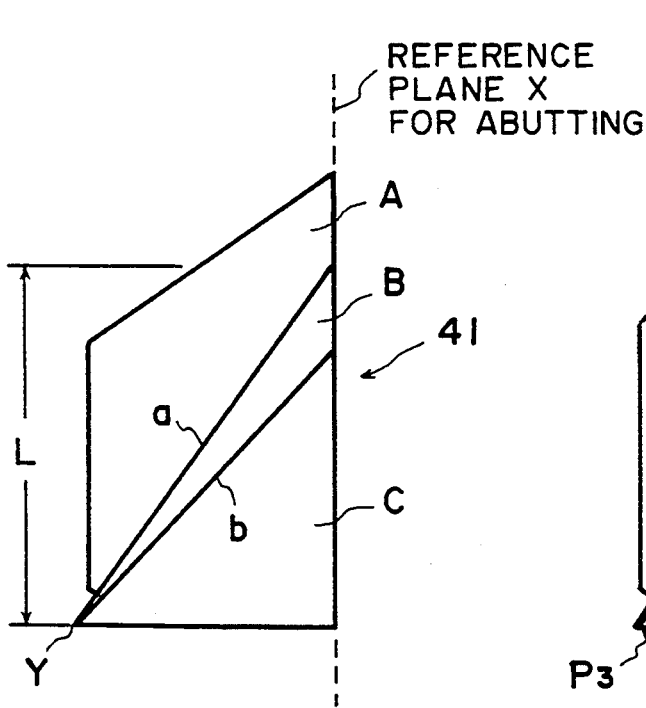
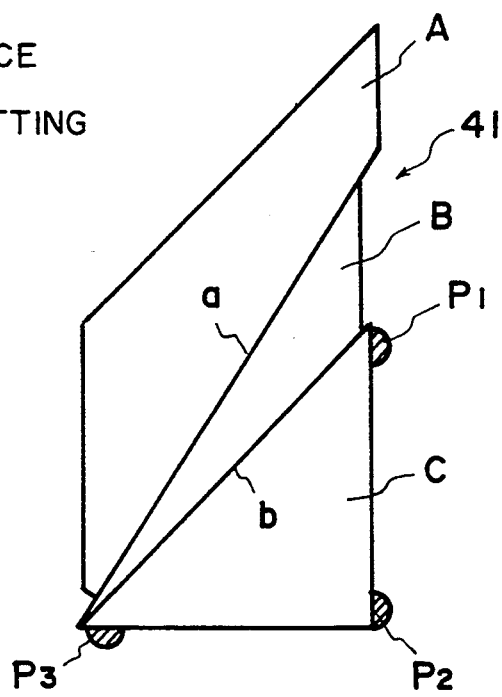
FIG. 13          FIG. 14

BEAM SPLITTER

This application is a continuation of prior application, U.S. application Ser. No. 08/009,067 filed Jan. 26, 1993, now abandoned.

BACKGROUND OF THE INVENTION

1. Field of the Invention

This invention relates chiefly to a beam splitter for use in an optical information recording-reproducing apparatus for optically or magneto-optically recording and/or reproducing information.

2. Related Background Art

In information recording-reproducing apparatuses for effecting the recording and/or reproduction of information by the use of light or light and magnetism, recording mediums in the form of a disk, a card or a tape have heretofore been used as recording mediums therefor. Among these optical or magneto-optical information recording mediums, there are widely known ones capable of recording and reproduction and ones capable of reproduction only. To record information on a medium capable of recording, a light beam modulated in accordance with recording information is condensed into the shape of a minute spot on said medium, and this spot is scanned along information tracks on said recording medium. Thereby, optically detectable information pit trains are formed on said recording medium.

Also, to reproduce information from said recording medium, a light beam of such a degree of low constant power not enough to effect recording on said-recording medium is condensed on said recording medium to thereby form a minute spot thereon, and the information pit trains on the information tracks are scanned by this minute spot. As a result, the reflected light or transmitted light from said recording medium is separated through an optical system and is read out.

The optical system used for the recording and/or reproduction of information on the above-described recording medium is equipped with an optical head which can be moved in the direction of the information tracks on the recording medium and a direction across that direction, and by the use of an objective lens provided on said optical head, a minute spot is formed on the recording medium from said light beam, and the information tracks on said recording medium can be scanned with the minute spot. Said objective lens is held on said optical head so as to be independently movable in the direction of the optical axis thereof (the focusing direction) and a direction orthogonal to both the direction of the optical axis and the direction of the information tracks on the recording medium (the tracking direction). Usually, a resilient member is used for such holding of the objective lens, and the movement of said objective lens in the two directions is effected by the driving of an actuator utilizing a magnetic interaction.

Among the above-mentioned optical information recording mediums, particularly the card-like optical information recording medium (hereinafter referred to as an optical card) is expected to have a big demand in the future as an information recording medium which is light in weight and convenient for carrying and has a relatively great capacity. The construction of such an optical card is generally as shown in FIGS. 1 and 2 of the accompanying drawings. That is, in FIG. 1, the optical card 1 has a number of information tracks 2 parallel-arranged in directions shown by arrows L-F on the information recording surface thereof, and a home position 3, which is the reference position of the access to the information tracks 2, is provided on said information recording surface. The information tracks 2 are arranged in the order of 2-1, 2-2, 2-3, . . . in succession from the home position 3, and as shown in FIG. 2, adjacent to these information tracks 2, tracks for tracking are provided in the order of 4-1, 4-2, 4-3, . . . These tracks 4 for tracking are used as a guide for auto-tracking (hereinafter referred to as AT) which controls the light beam spot so as not to deviate from a predetermined information track during the recording and/or reproduction of information.

In the optical system, a servo system for this AT functions to detect the deviation of said light beam spot from the information track (AT error), to negatively feed back the detection signal to the actuator, to move said objective lens in the tracking direction (D direction in FIG. 1) and to cause the light beam spot to follow a desired information track.

On the other hand, auto focusing (hereinafter referred to as AF) is effected to make the light beam spot on the surface of the optical card into a suitable size (focus the light beam spot) as long as the information tracks are scanned by the light beam spot during the recording and/or reproduction of information. In the optical system, a servo system for this AF functions to detect the deviation of the light beam spot from the in-focus state (AF error), to negatively feed back the detection signal to the actuator for focusing, to move the objective lens in the focusing direction and to focus the light beam spot on the surface of the optical card.

Therefore, in the optical system, the light beam applied to the optical card is divided into three light beams, which are made into three light beam spots S1, S2 and S3, respectively, on the optical card, as shown in FIG. 2. Tracking control for the information tracks is effected by the use of the light beam spots S1 and S3, and focusing control, the production of information pits during recording and the reading-out of the information pits during reproduction are effected by the use of the light beam spot S2. In the respective information tracks shown in FIG. 2, reference characters 6-1, 6-2, and 7-1, 7-2 designate preformed left address portions and right address portions, and by these address portions being read out during the recording and/or reproduction of information, discrimination between the information tracks is effected. Also, in FIG. 2, reference characters 5-1 and 5-2 denote predetermined information recorded on a data portion.

As is well known, there are broadly two kinds of optical information recording systems using the above-described optical system. One of them is a single-light-source system which effects recording and reproduction by one and the same light source, and the other is a two-light-source system which effects recording and reproduction by two different light sources. The two-light-source system, as compared with the single-light-source system, is said to have the advantages that the reproducing light is not deteriorated and the system is suited for the realization of a higher speed.

The optical system of the conventional two-light-source system is of a construction as shown in FIG. 3 of the accompanying drawings in which recording light and reproducing light are supplied from discrete light sources, whereby deterioration of the reproducing light is prevented and high-speed recording is made possible. In FIG. 3, a semiconductor laser 21 as a light source emits light of a wavelength of 780 nm and another semiconductor laser 22 emits light of a wavelength of 830 nm. In FIG. 3, reference numerals 23 and 24 designate collimator lenses, reference numeral 25 denotes a diffraction grating for dividing a light beam, reference numeral 26 designates a dichroic prism designed to transmit therethrough light of 780 nm which is a P-polarized component and reflect light of 830 nm, and reference numeral 27 denotes a polarizing beam splitter (a beam shaping prism). Reference numeral 29 designates a quarter wavelength plate, reference numeral 30 denotes an objective lens, reference numeral 32 designates a light intercepting plate, reference numeral 33 denotes a toric lens, and reference numeral 34 designates a photodetector.

Light beams emitted from the semiconductor lasers 21 and 22 are divergent light beams and therefore, pass through the collimator lenses 23 and 24, whereby they are converted into parallel light beams. The light of 780 nm from the semiconductor laser 21 further enters the diffraction grating 25, and is divided into three effective light beams (0-order diffracted light and ±1st-order diffracted light) by the function of this diffraction grating. The light beam of 780 nm and the light beam of 830 nm from the semiconductor laser 22 enter the dichroic prism 26 having a necessary spectral characteristic, and the light of 780 nm which is P-polarized light is transmitted through the dichroic prism and the light of 830 nm is reflected by the dichroic prism, and the two light beams in their combined state emerge from the dichroic prism 26. The light beam passed through this dichroic prism 26 enters the polarizing beam splitter 27 having the light splitting function. The polarizing beam splitter 27 has such a spectral characteristic that transmits P-polarized light and reflects S-polarized light, but the light beams of two wavelengths are P-polarized light components and are therefore transmitted through this polarizing beam splitter. The polarizing beam splitter 27 is three-point-supported relative to an optical head housing (not shown) by abutting portions $P_1$, $P_2$ and $P_3$. The polarizing beam splitter 27 is comprised of three prisms.

These light beams of two wavelengths are then converted into circularly polarized lights when they are transmitted through the quarter wavelength plate 29, and are converged on the optical card 1 which is the information recording medium by the objective lens 30. The light beam of 780 nm, in the form of three minute beam spots S1 (+1st-order diffracted light), S2 (0-order diffracted light) and S3 (−1st-order diffracted light), is applied onto the optical card 1, and spot S2 is used as reproducing light and a light signal for AF control, and spots S1 and S3 are used as light signals for AT tracking. Also, the light beam of 830 nm, in the form of a minute beam spot S2 (0-order diffracted light), is applied onto the optical card 1 and is used as recording light.

In this case, the positions of the light beam spots on the optical card 1 are similar to those in FIG. 2, that is, the light beam spots S1 and S3 are positioned on adjacent tracks 4 for tracking and the light beam spot S2 is positioned on the information track 2 between those tracks 4. Also, the positional relation between the light beam spot S2 of 780 nm and the light beam spot S2 of 830 nm is free in principle and here, these two light beam spots are positionally coincident with each other. Thus, the reflected light from the light beam spots formed on the optical card 1 passes through the objective lens 30 and becomes a substantially parallel light beam, and is again transmitted through the quarter wavelength plate 29 and becomes a light beam having its direction of polarization rotated by 90° from that during the incidence. Therefore, the reflected light enters the polarizing beam splitter 27 as an S-polarized light beam. However, the polarizing beam splitter 27 has the characteristic of reflecting S-polarized light, as previously described. Here, the reflected light from the light spot of 830 nm is reflected and directed to the light intercepting plate 32. Also, the reflected light from the light spot of 780 nm is converged by the toric lens 33 and enters the photodetector 34. The photodetector 34 is comprised, for example, of two light receiving elements and a four-division light receiving element, and a signal for tracking control is provided by the former and a signal for focusing control and reproduction is provided by the latter.

What poses a problem here is that in the aforedescribed information recording-reproducing apparatus for optically or magneto-optically effecting the recording and/or reproduction of information, to accomplish stable recording and/or reproduction or AT/AF control, high manufacturing and assembling accuracy of optical parts in the optical system is required. Particularly, in the aforedescribed polarizing beam splitter 27 constructed by a combination of a plurality of optical parts (glass-molded articles), the cementing accuracy of the optical parts, in addition to the fixing accuracy, must be high.

Therefore, there are known the following two methods in the cementing work for the polarizing beam splitter. One method is a method as shown in FIG. 4 of the accompanying drawings wherein when three prism members A, B and C are to be superposed one upon another so as to have the light splitting function on the cemented surfaces thereof, the sides $A_1$, $B_1$ and $C_1$ thereof opposite to a location in which the vertex angles of the respective prism members concentrate (point Y in FIG. 5) are abutted against a reference plane X and in that state, the prism members are cemented together. The other method is a method as shown in FIG. 5 of the accompanying drawings wherein the vertex angles of the respective prism members are concentrated at point Y and the prism members are cemented together.

However, when the prism members are cemented together by any of such methods, if there exist working errors of the respective prism members, dimensional error during the abutting of the prism members, irregularity of the thicknesses of an adhesive agent, etc., there will occur an angular error attributable to the shift of each prism member or the mutual pressing among the prism members.

That is, if as shown in FIG. 6 of the accompanying drawings, a working error exists in the prism member B and the prism member B is smaller than the design value, a gap E will be created between the prism members A and B.

In order to eliminate such a gap E, it would occur to mind to shift each prism member as shown in FIG. 7 of the accompanying drawings, concentrate the vertex angles of the respective prism members at a point Y and cement the prism members together. In such a case, however, the prism member A would be inclined. This would lead to the deviation of the emergence position and the deviation of the emergence angle of the beam from a constituent member as a polarizing beam splitter, and would finally bring about a fluctuation in the AT/AF control signal.

Description will now be made of a problem arising when the polarizing beam splitter 27, in which an angular error attributable to the shift of each prism member or the mutual pressing among the prism members has occurred as described above, is supported.

If as shown in FIGS. 8 and 9 of the accompanying drawings, abutting portions $P_1$, $P_2$ and $P_3$ as shown are adopted in a three-point-support, the polarizing beam splitter 27 in which such angular error has occurred on an optical head housing, actual transmitted light (indicated by a solid line in FIG. 8) will be shifted relative to the ideal optical axis (indicated by a dotted line in FIG. 8) or will have an angular error.

SUMMARY OF THE INVENTION

The present invention has been made by taking into consideration the above-noted circumstances and intends to provide a beam splitter designed such that the spacing between the incidence position and the emergence position of a light beam can be accurately adjusted when the prism members are cemented together.

For this purpose, according to the present invention, in a beam splitter constructed of at least three prism members superposed one upon another so as to have the a light splitting function on the cemented surfaces thereof, at least one of the prism members is of a shape in which its vertex angle is cut off or truncated (flattened) so that positional adjustment may be made on said cemented surfaces to make the spacing between the incidence position and the emergence position of a transmitted beam constant at locations whereat the vertex angles of the prism members concentrate during said superposition.

If, like this, at least one prism member assumes a shape in which its vertex angle is cut off, there will not occur the angle error attributable to the mutual arrangement of the vertex angles of the three prism members as described above with reference to FIGS. 6 and 7.

BRIEF DESCRIPTION OF THE DRAWINGS

FIG. 10 shows the construction of an embodiment of an optical information recording-reproducing apparatus using the polarizing beam splitter of the present invention.

FIG. 11 is a side view showing the assembled structure of a polarizing beam splitter of the present invention.

FIG. 12 is a side view showing the assembled structure of another polarizing beam splitter of the present invention.

FIG. 13 is a side view showing the assembled structure of still another polarizing beam splitter of the present invention.

FIG. 14 is a side view showing the mounted structure of a polarizing beam splitter of the present invention.

DETAILED DESCRIPTION OF THE PREFERRED EMBODIMENTS

Figure 1:
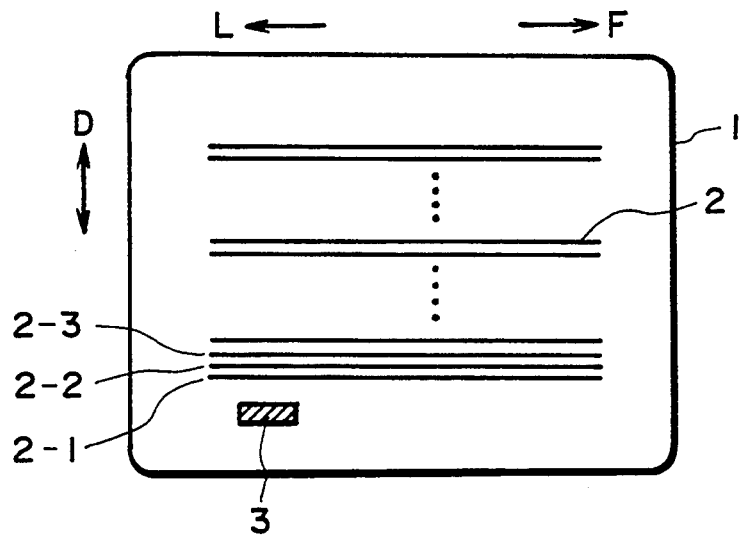
FIG. 1 is a plan view of an optical card.
Figure 2:
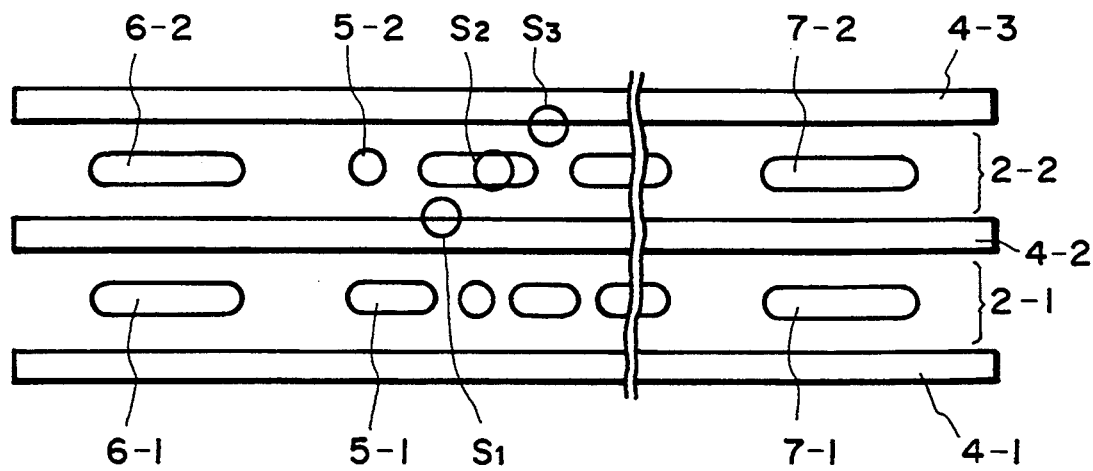
FIG. 2 is a fragmentary enlarged view of the optical card shown in FIG. 1.
Figure 3:
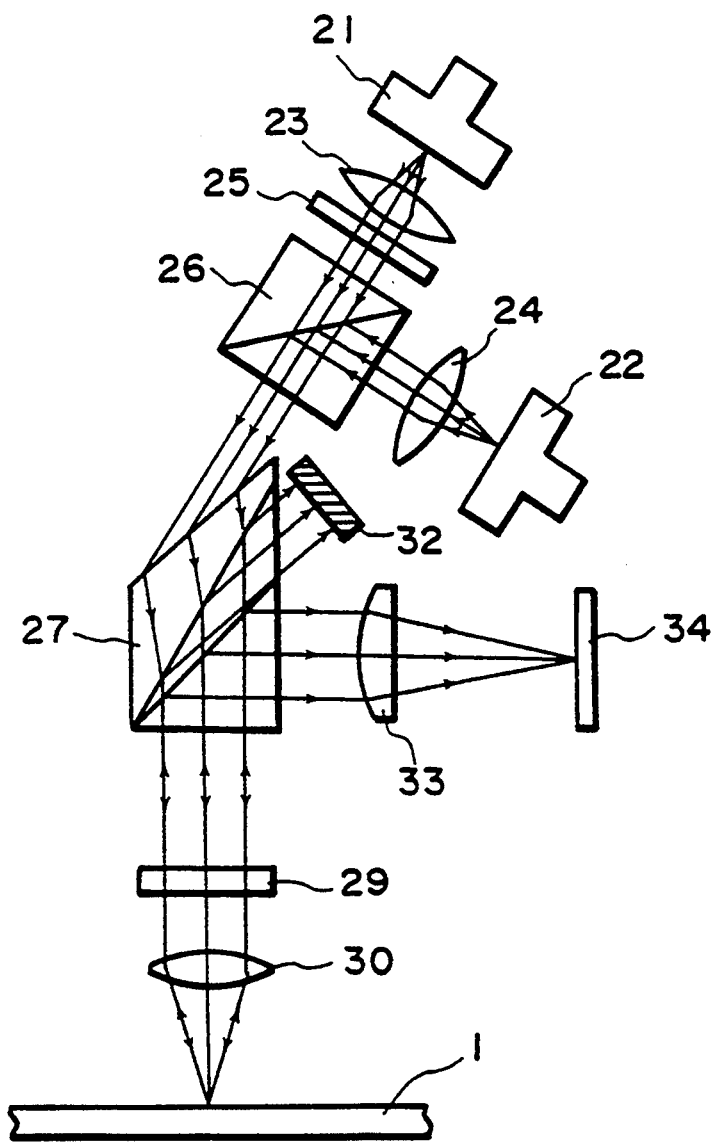
FIG. 3 shows the construction of an optical head optical system of the conventional two-light-source type.
Figure 4:
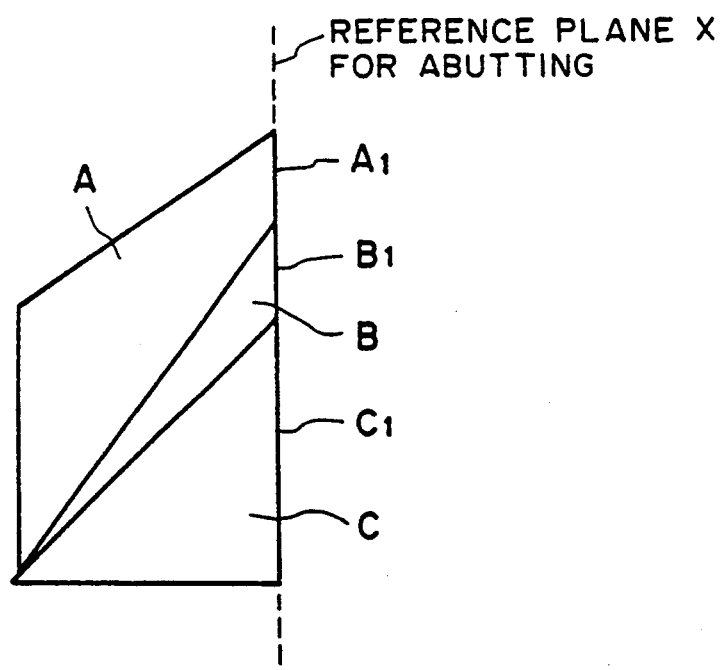
FIG. 4 is a side view showing the assembled structure of a prior-art polarizing beam splitter.
Figure 5:
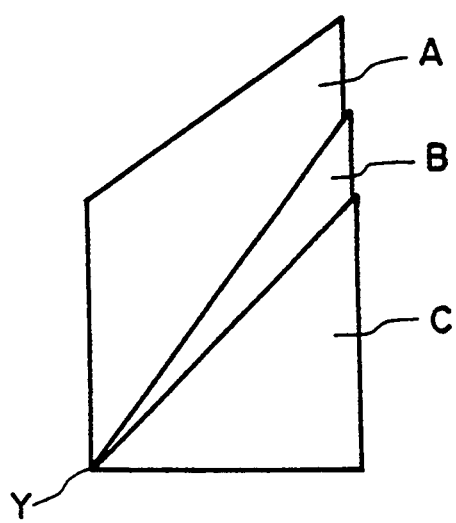
FIG. 5 is a side view showing the assembled structure of another prior-art polarizing beam splitter.
Figure 6:
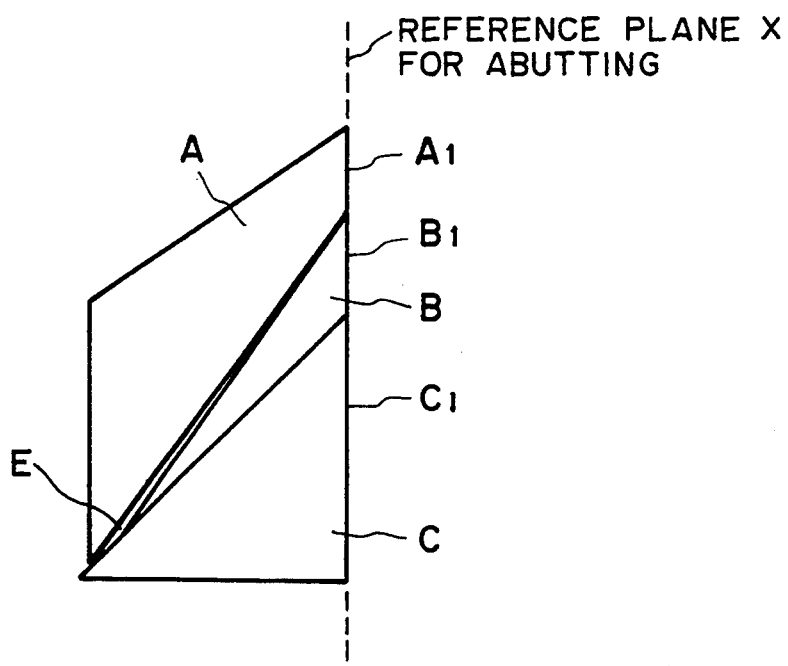
FIGS. 6 and 7 are views illustrating a problem arising when a working error exists in prism members constituting a polarizing beam splitter.
Figure 7:
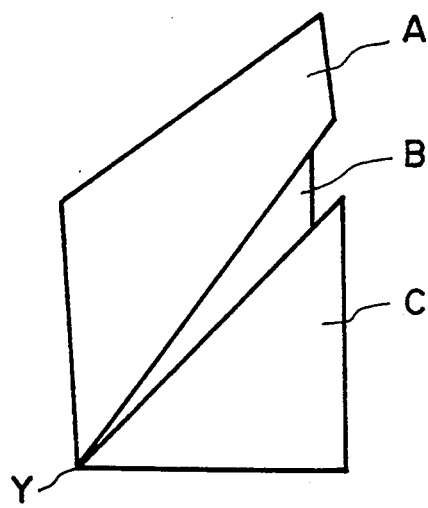
Figure 8:
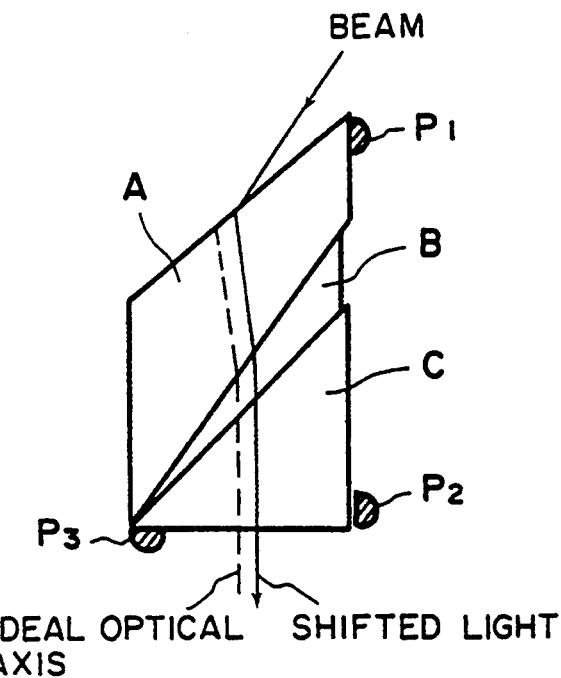
FIG. 8 is a side view showing the mounted structure of a prior-art polarizing beam splitter.
Figure 9:
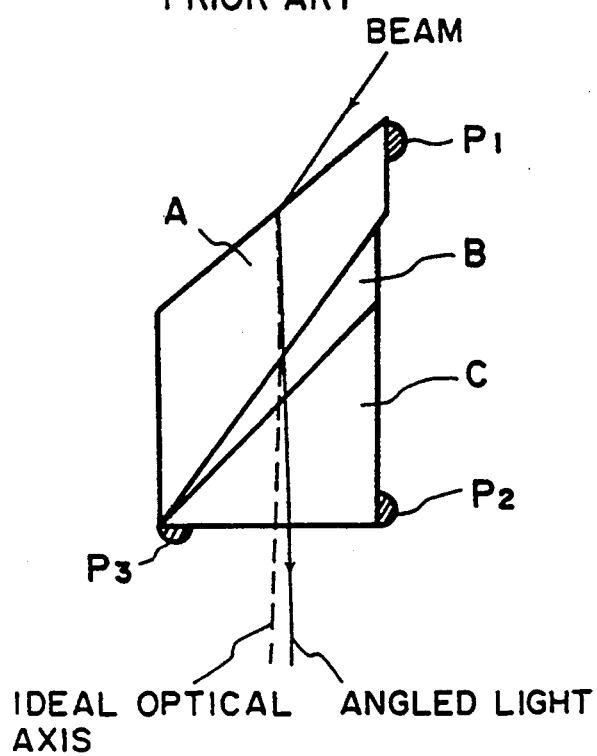
FIG. 9 is a side view showing the mounted structure of another prior-art polarizing beam splitter.

Some embodiments of an optical information recording-reproducing apparatus using the polarizing beam splitter of the present invention will hereinafter be described in detail with reference to FIGS. 10 to 13. In these figures, the same portions as those in the construction of the prior art are given the same reference characters and need not be described.

Reference numeral 41 designates a polarizing beam splitter (a beam shaping prism) which is a feature of the present invention. Particularly in this embodiment, polarizing beam splitter 41 has a polarizing splitting function and in addition, a beam shaping function and a wavelength dividing function. That is, the polarizing beam splitter 41 is of a structure comprising three prism members A, B and C cemented together, and the cemented surfaces (joined surfaces) a and b of the semiconductor laser side thereof have respective unique spectral characteristics. The surface a has a spectral characteristic of transmitting p-polarized light and reflecting S-polarized light, and the surface b has a spectral characteristic of transmitting P-polarized light and reflecting S-polarized light of a waveband of 780 nm. Also, the polarizing beam splitter. 41 is formed of at least two kinds of glass materials and has an achromatizing action. Accordingly, the polarizing beam splitter can correct chromatic aberration by the achromatizing action and suppress the influence of wavelength fluctuation of laser light. In FIG. 10, reference numeral 42 denotes a light intercepting plate which is a stopper for absorbing light of a wavelength of 830 nm reflected by the surface a. The information recording and reproducing operations in this optical system are similar to those in the prior art and therefore need not be described. However, the polarizing beam splitter 41 adopted herein is assembled in the following manner.

That is, the polarizing beam splitter 41 is of such a shape that as shown in FIG. 11, one vertex angle of one of the prism members constituting it, for example, the prism member A in this embodiment, is cut off or truncated (flattened) (at a location whereat the vertex angles of the prism members concentrate when the three prism members A, B and C are superposed one upon another to construct the polarizing beam splitter). Then, the prism members B and C are first cemented together with a necessary adhesive agent interposed therebetween so that the vertex angles thereof may coincide with each other at a point Y. Subsequently, the flattened portion of the prism member A is located near the point Y, and the prism member A is cemented onto the prism member B with a necessary adhesive agent interposed therebetween. The prism member A is then slid in the Z direction so that the spacing L between the incidence position (the prism member A side) and the emergence position (the prism member C side) of a beam in the beam shaping prism 41 may be a predetermined value. At a stage whereat the spacing L has been adjusted thereby, the cementing of the prism members A and B is completed. If this is done, during the adjustment of the spacing, the vertex angles of the three prism members do not press one another at the point Y and parallel shift of a beam and angular error do not occur. Thus, the light beam always passes through the ideal optical axis of the polarizing beam splitter 41. The size of the flattened portion of the prism member A may be a suitable size if it is within a range in which the light beam is not eclipsed during use.

In FIG. 12, the construction of a polarizing beam splitter in which not only the vertex angle of the prism member A, but also the vertex angle of the prism member C are cut off or truncated (flattened) is shown as another embodiment of the polarizing beam splitter 41. A merit similar to that of the above-described embodiment is also obtained by this construction. Of course, the vertex angles of all prism members may be cut off or truncated (flattened).

Also, as shown in. FIG. 13, if the spacing L is compensated for, the prism members A, B and C may be superposed one upon another in such a manner that the cemented surfaces a and b are position-adjusted to each other so that the sides of the prism members A, B and C which are opposed to the vertex angles may be adjusted to the reference plane X for abutting.

As described above, the present invention is a beam splitter comprised of at least three prism members superposed one upon another so as to have the light splitting function on the cemented surfaces thereof, characterized in that at least one of the prism members is of a shape in which the vertex angle thereof is cut off or truncated (flattened) so that position adjustment may be made on the cemented surfaces to make the spacing (L) between the incidence position and the emergence position of a transmitted light beam constant at a location whereat the vertex angles of the prism members concentrate during the superposition.

Also, the present invention is characterized in that the prisms are superposed one upon another so that said cemented surfaces may be position-adjusted to each other so that the sides of said prism members which are opposed to the vertex angles may be aligned to the same reference plane.

In the above-described embodiments, the beam splitter of the present invention has been described with an optical head of the two-light-source type as an example, but the present invention can also be applied in an optical head of the single-light-source type when use is made of a beam splitter comprised of three or more prism members superposed one upon another.

FIG. 14 illustrates a method of supporting the polarizing beam splitter of the present invention. When the polarizing beam splitter 41 is to be mounted on an optical head housing (not shown), it is advantageous when accurately holding the optical axis to secure a rectangular prism C to the optical head housing at three points $P_1$, $P_2$ and $P_3$ on the two surfaces of the rectangular prism which define the right-angled portion of the rectangular prism therebetween, as shown in FIG. 14.

Thus, the polarizing beam splitter is fixed by being abutted against the optical head housing by means of only one rectangular prism of the three prisms and therefore, when fixing it, the cementing error of the prisms and the cumulated working error of each prism can be eliminated.

Also, in FIG. 14, a beam splitter using three prism members is shown as an example, but in a beam splitter comprised of two or more prism members superposed one upon another, three-point support may be effected on only one of the prism members, as described above, whereby the mounting of the beam splitter onto the optical head housing can be accomplished accurately.

As described above, according to the present invention, in the cementing together of at least three prism members, the respective vertex angles thereof do not press one another and the creation of parallel shift of the light beam and any angular error are avoided and thus, stable recording, reproduction and/or AT/AF control can be realized. Also, by adopting a construction in which three-point support is effected on a single prism member, the mounting of the beam splitter onto an optical head housing can be accomplished accurately and thus, the parallel shift and angular error which have been encountered in the conventional mounting means can be avoided.

What is claimed is:

1. An optical head comprising:
  applying means for applying a light beam onto a recording medium;
  splitting means for splitting the light beam from the recording medium, said splitting means comprising (i) a first prism member having a vertex end, (ii) a second prism member having a vertex end and being cemented to said first prism member and (iii) a third prism member having a vertex end and being cemented to said second prism member, said vertex ends of each of said first, second and third prism members being arranged proximate to one another and said vertex end of at least one of said first, second and third prism members being truncated; and
  detecting means for detecting the light beam split by said splitting means,
  wherein said vertex ends of each of said first, second and third prism members are arranged opposite to said detecting means, with respect to the light beam applied to the recording medium by said applying means.

2. An optical head according to claim 1, wherein only one of said first, second and third prism members is mounted on a housing of said optical head by a three-point support.

3. An optical head according to claim 2, wherein said one prism mounted on the housing of said optical head by the three-point support is a rectangular prism.

* * * * *

UNITED STATES PATENT AND TRADEMARK OFFICE
CERTIFICATE OF CORRECTION

PATENT NO. : 5,418,769
DATED : May 23, 1995
INVENTOR(S) : Masato INOUE

It is certified that error appears in the above-indentified patent and that said Letters Patent is hereby corrected as shown below:

COLUMN 1:

Line 32, "said-recording" should read --said recording--.

COLUMN 2:

Line 21, "auto focusing" should read --auto-focusing--.

COLUMN 6:

Line 34, "splitter." should read --splitter--.

Signed and Sealed this

Twenty-ninth Day of August, 1995

Attest:

BRUCE LEHMAN

Attesting Officer     Commissioner of Patents and Trademarks